United States Patent
Thies

(10) Patent No.: US 10,669,036 B2
(45) Date of Patent: Jun. 2, 2020

(54) TURBOFAN ENGINE COMPRISING A FAIRING BEING LOCATED IN THE SECONDARY FLOW CHANNEL AND HAVING A SEPARATE END ELEMENT

(71) Applicant: Rolls-Royce Deutschland Ltd & Co KG, Blankenfelde-Mahlow (DE)

(72) Inventor: Robert Thies, Schwielowsee (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 346 days.

(21) Appl. No.: 15/672,793

(22) Filed: Aug. 9, 2017

(65) Prior Publication Data
US 2018/0044030 A1    Feb. 15, 2018

(30) Foreign Application Priority Data
Aug. 11, 2016  (DE) .......................... 10 2016 215 030

(51) Int. Cl.
*F02C 7/04* (2006.01)
*B64D 29/06* (2006.01)
(Continued)

(52) U.S. Cl.
CPC ............... *B64D 29/06* (2013.01); *F01D 9/02* (2013.01); *F01D 9/065* (2013.01); *F02C 7/04* (2013.01);
(Continued)

(58) Field of Classification Search
CPC . B64D 29/06; F01D 9/02; F01D 25/28; F01D 1/023; F01D 9/065; F01D 25/14;
(Continued)

(56) References Cited

U.S. PATENT DOCUMENTS 2,884,078 A * 4/1959 Stamm .................. B64C 27/473
                                                                416/226
4,993,918 A   2/1991 Myers et al.
(Continued)

FOREIGN PATENT DOCUMENTS

FR          2996070 A1      3/2014
JP      2002188513 A         7/2002
(Continued)

OTHER PUBLICATIONS

German Search Report dated May 19, 2017 from counterpart German App No. 10 2016 215 030.8.
European Search Report dated Dec. 13, 2017 from counterpart European App No. 17183952.5.

*Primary Examiner* — Steven M Sutherland
(74) *Attorney, Agent, or Firm* — Shuttleworth & Ingersoll, PLC; Timothy J. Klima

(57) ABSTRACT

A turbofan engine including a core engine and at least one fan by means of which fluid is guided to a primary flow channel for the core engine as well as to a secondary flow channel of the turbofan engine, wherein the secondary flow channel is provided for an outer fluid flow that is guided past the core engine, and at least one splitter fairing arranged inside the secondary flow channel around which the fluid flow is flowing during operation of the turbofan engine, which cases at least one component of the turbofan engine that is guided radially through the secondary flow channel, and which has an end element with a leading edge section that is facing towards the fluid flow and/or a trailing edge section that is positioned in the flow direction of the fluid flow.

19 Claims, 11 Drawing Sheets

(51) Int. Cl.
  *F01D 9/06* (2006.01)
  *F01D 9/02* (2006.01)
  *F02K 1/52* (2006.01)
  *F02K 3/06* (2006.01)
  *F01D 25/28* (2006.01)

(52) U.S. Cl.
  CPC .................. *F02K 1/52* (2013.01); *F02K 3/06* (2013.01); *F01D 25/28* (2013.01); *F05D 2230/64* (2013.01); *F05D 2230/70* (2013.01); *F05D 2240/121* (2013.01); *F05D 2240/122* (2013.01); *F05D 2260/30* (2013.01); *F05D 2260/36* (2013.01); *F05D 2260/38* (2013.01)

(58) Field of Classification Search
  CPC ........ F01D 25/24; F01D 25/26; F01D 415/22; F01D 415/108; F02C 7/04; F02K 1/52; F05D 2230/64; F05D 2230/70; F05D 2240/121; F05D 2240/122; F05D 2260/30; F05D 2260/36; F05D 2260/37; F05D 2260/38
  See application file for complete search history.

(56) References Cited

U.S. PATENT DOCUMENTS

| | | |
|---|---|---|
| 7,484,354 B2 | 2/2009 | Stretton |
| 2005/0132715 A1 | 6/2005 | Allen et al. |
| 2005/0247042 A1 | 11/2005 | Fert et al. |
| 2007/0234706 A1* | 10/2007 | Gagneux ................ F01D 9/065 60/226.1 |
| 2010/0170887 A1* | 7/2010 | Alexander ............ F01D 9/065 219/541 |
| 2014/0060079 A1 | 3/2014 | Foster |
| 2014/0140820 A1 | 5/2014 | Todorovic |
| 2014/0190180 A1* | 7/2014 | Soderlund ................ F02C 7/20 60/797 |
| 2016/0305287 A1* | 10/2016 | Honda .................. F01D 25/246 |

FOREIGN PATENT DOCUMENTS

| | | |
|---|---|---|
| WO | WO2014018137 A2 | 1/2014 |
| WO | WO2015028756 A1 | 3/2014 |

* cited by examiner

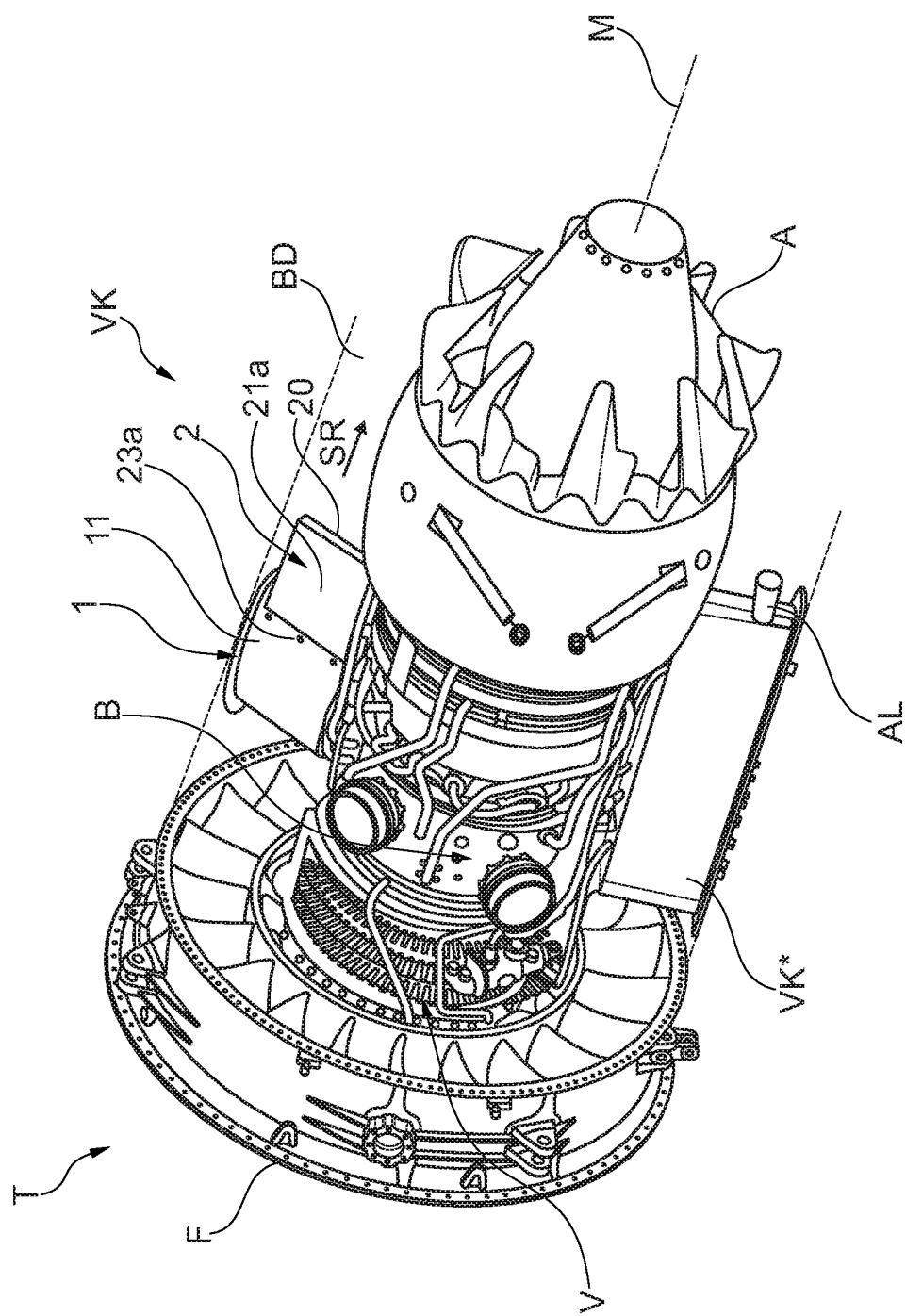

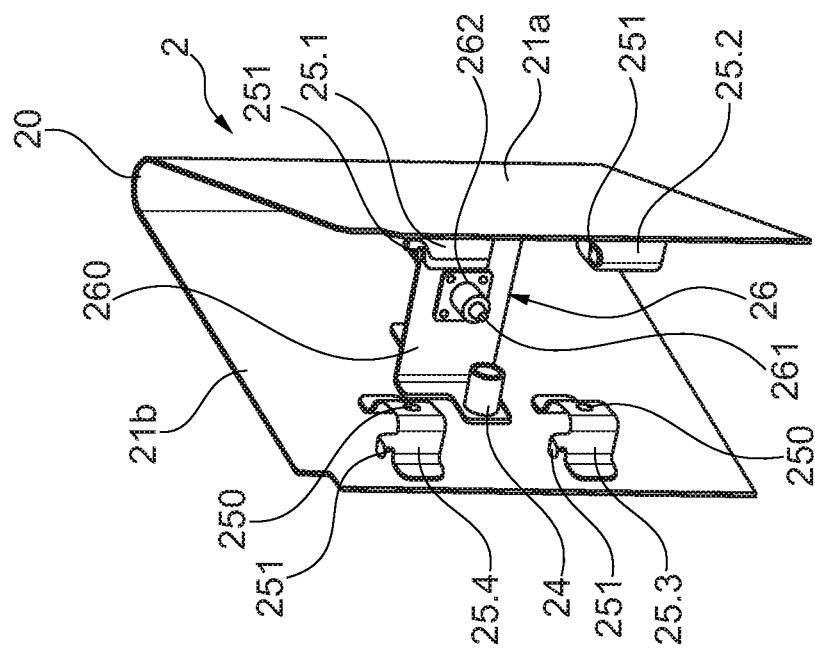
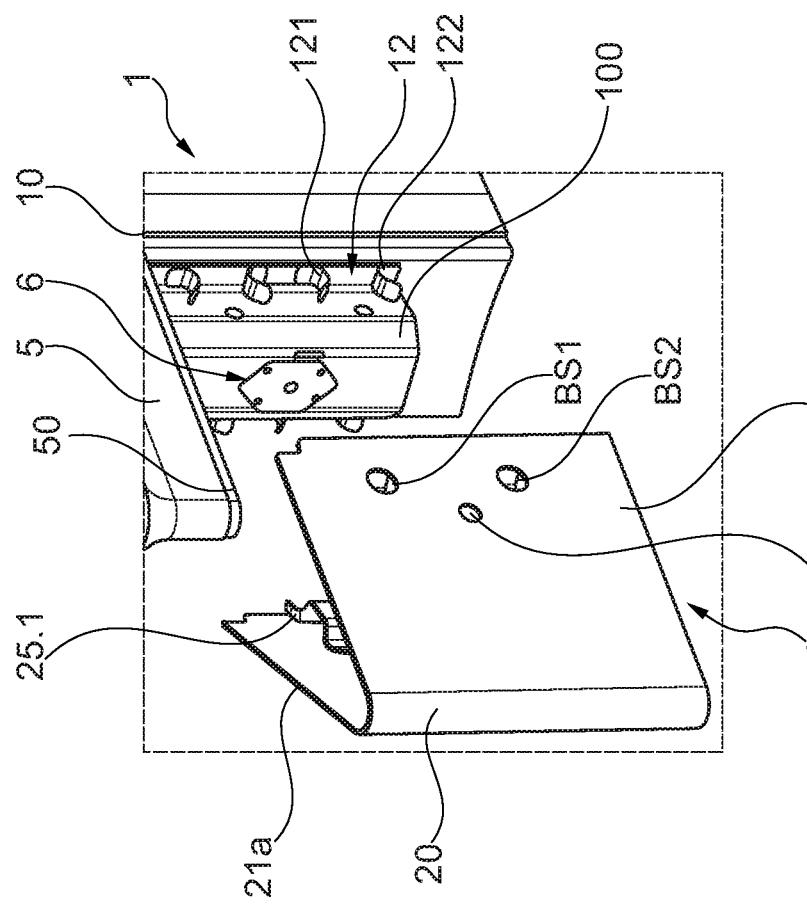

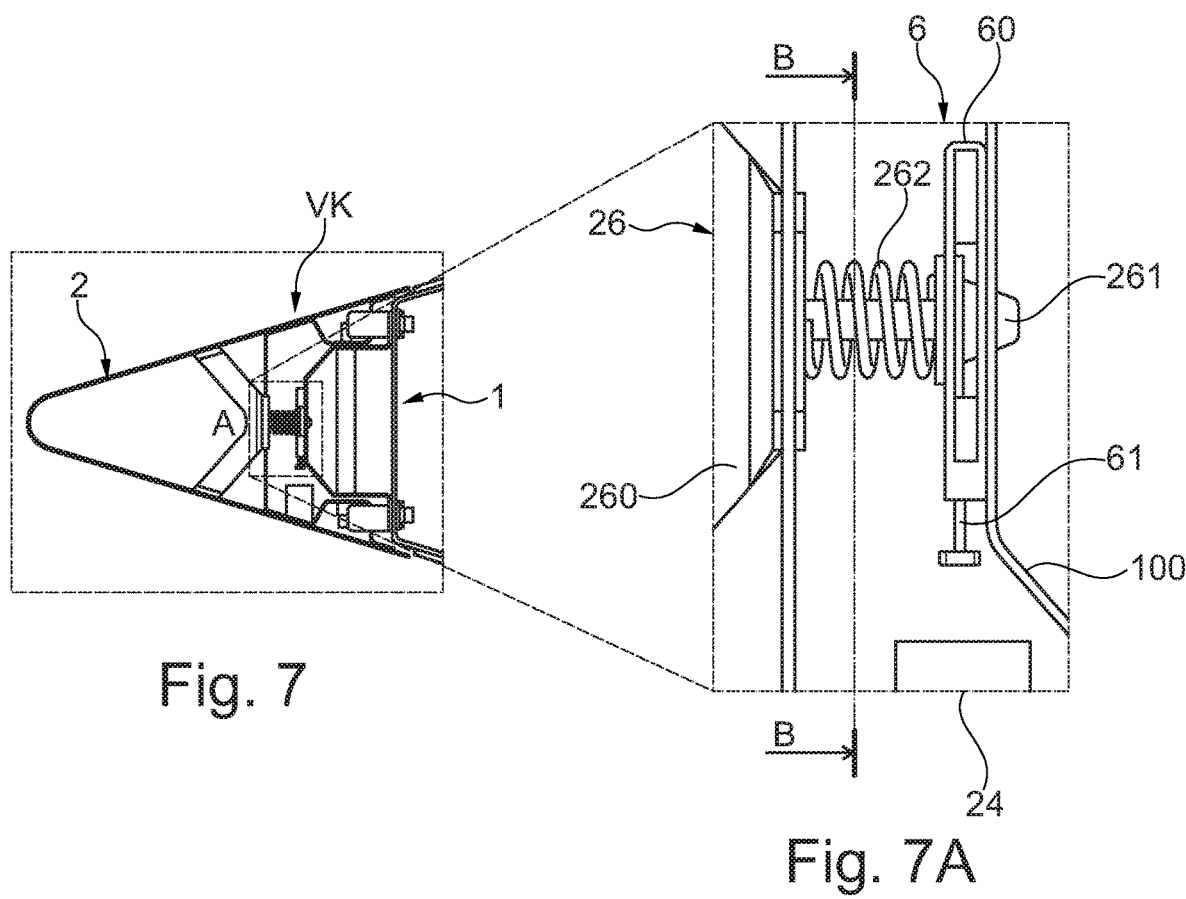
Fig. 7
Fig. 7A
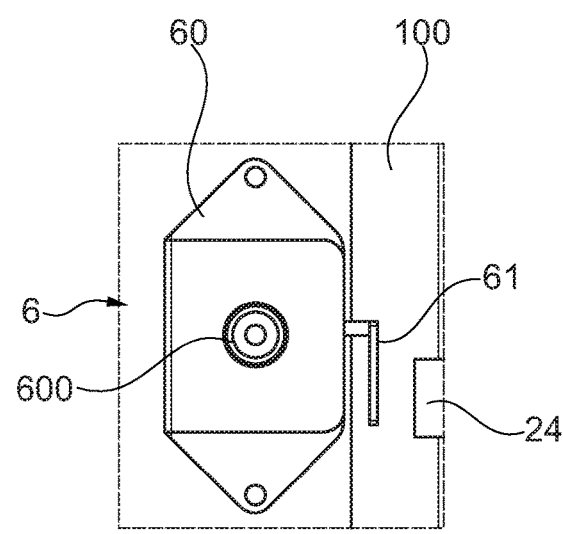
Fig. 7B

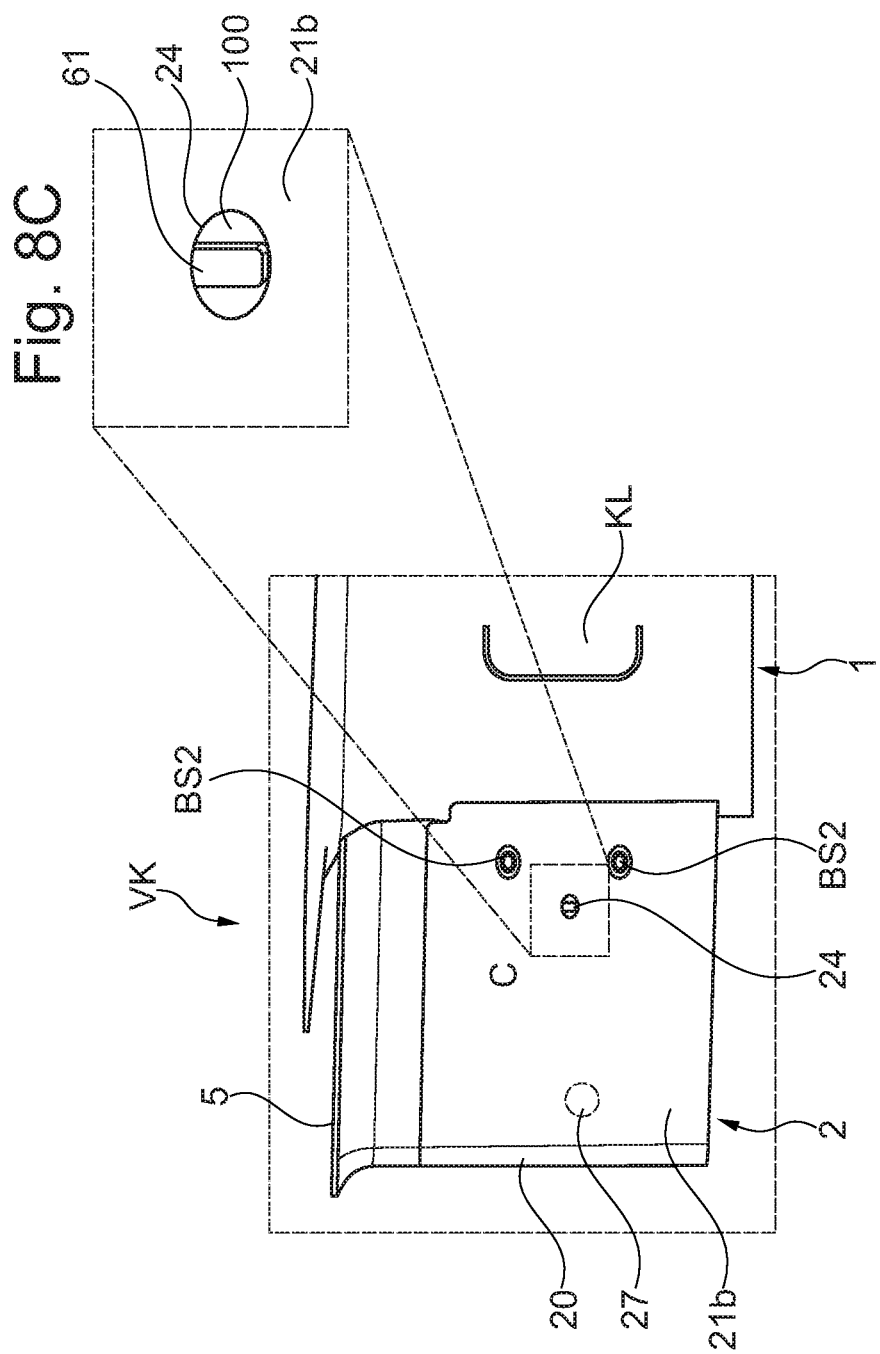

TURBOFAN ENGINE COMPRISING A FAIRING BEING LOCATED IN THE SECONDARY FLOW CHANNEL AND HAVING A SEPARATE END ELEMENT

REFERENCE TO RELATED APPLICATION

This application claims priority to German Patent Application No. 10 2016 215 030.8 filed on Aug. 11, 2016, the entirety of which is incorporated by reference herein.

BACKGROUND

The invention relates to a turbofan engine.

Turbofan engines are also referred to as turbofans or bypass engines. They are characterized by the fan (also referred to as a blower) being driven by a turbine that is arranged behind the combustion chamber of the turbofan engine, wherein a large portion of the air mass that is sucked in by the engine is accelerated past a core engine that comprises the combustion chamber. Here, the turbofan engine forms a primary flow channel through the core engine as well as a secondary flow channel for an outer fluid flow that is guided past the core engine.

Different components, such as conduits, struts or adjustable coupling elements, are arranged inside the turbofan engine and in particular extend through the secondary flow channel. They have to be guided partially through the secondary flow channel radially outwards. For example, air or oil is conducted in corresponding conduits, or the latter as are power or signal lines. Adjustable coupling elements that are guided radially through the secondary flow channel may for example serve for the mechanical coupling and driving of systems that are positioned radially outside with respect to the core engine within the engine housing to provide better cooling, such as for example auxiliary gear boxes, a fuel pump, oil pump or generator. In order to guide the respective components through the secondary flow channel in such a way that they are protected from outer influences and are less interfering from the aerodynamic perspective, a splitter fairing is usually provided, by which the respective components are cased inside the secondary flow channel, so that a fluid flowing inside the flow channel is guided past the component in a manner that is as advantageous as possible with a view to aerodynamic aspects. This splitter fairing is arranged inside a secondary flow channel and extends inside the secondary flow channel in particular in the radial direction with respect to a central axis of the turbofan engine.

In order to provide a controlled guiding of the fluid flow around the splitter fairing, the splitter fairing has an end element which has a leading edge section that is facing towards the fluid flow and/or a trailing edge section that lies in the flow direction of the fluid flow. In practice, such splitter fairings are structural components having a comparatively simple structural design and usually being fixated at a radially inner and/or radially outer wall of the secondary flow channel. For example, what is thus shown also in US 2014/0060079 A1 is a splitter fairing for a shaft that is guided radially inside a secondary flow channel and that has a semi-circular cross section and behind which—as viewed in the flow direction of the fluid flow inside the secondary flow channel—the shaft leading to the gear unit extends. At that, the splitter fairing that is thus integrating an end element with a leading edge section is inserted into a mounting opening at an outer wall of the secondary flow channel, and is fixated by means of multiple bolts.

US 2014/0140820 A1 also describes a comparable splitter fairing with an end element that is formed integrally at the same for casing the conduits that are guided through the secondary flow channel. At that, the splitter fairings shown herein are fixated in a form-fit manner at a radially inner as well as a radially outer wall of the secondary flow channel.

However, the splitter fairings that are disclosed in US 2014/0060079 A1 and US 2014/0140820 A1 as well as the splitter fairings that are used in practice for being arranged inside a secondary flow channel are comparatively disadvantageous when it comes to maintaining and repairing the turbofan engine, as they make access to components located inside and/or above or below the splitter fairing considerably harder. Besides, a compromise always has to be found for example if fluid conduits are to be guided inside a hollow-cylindrical splitter fairing, and thus the splitter fairing has to be designed with a view to a possible bursting of a conduit in the event that high pressures, aggressive liquids or gases are present, and/or has to be designed so as to be fire-proof, while at the same time the splitter fairing has to have an aerodynamically advantageous design.

SUMMARY

Thus, the invention is based on the objective to provide a turbofan engine that is improved in this respect and that has a splitter fairing that is arranged inside a secondary flow channel.

This objective is achieved through a turbofan engine with features as described herein.

Accordingly, it is provided according to the invention that the inside the splitter fairing that is arranged inside the secondary flow channel (also referred to as the bypass channel) and around which the fluid flow is flowing during operation of the turbofan engine is embodied with at least two parts, and apart from the receiving body that receives the at least one component that extends inside the secondary flow channel radial, has an end element that is embodied as a separate structural component having a leading edge and/or a trailing edge section. The receiving body, which can in particular be embodied for the splitter fairing of fluid-conducting conduits, e.g. as a hollow-cylindrical pressure body, can thus be made of a different material than the end element forming the leading edge and/or the trailing edge section, which is primarily designed with a view to having a geometry that is maximally advantageous from the aerodynamic point of view. Thus, the separate end element can be made of a less rigid and lighter material than the receiving body, which has to be able to absorb comparatively strong forces in the event of a failure of a component that is at least partially cased by the splitter fairing. Through the releasable attachment of the end element at the receiving body it is also achieved that the mounting as well as the dismantling of the splitter fairing can be facilitated and the components guided in the area of the splitter fairing or inside the receiving body can be accessed in a much easier manner.

When it comes to an aerodynamically advantageous geometry, the end element for example has a V-shaped or triangular cross section, in which two side surfaces that are connected to the receiving body extend away from a leading edge or a trailing edge in a leg-like manner. Via such an end element, a fluid flow is thus guided from the leading edge along the end element and the splitter fairing. Analogously, the fluid flow that is divided by the splitter fairing is merged again at the end of the splitter fairing through a correspondingly tapering trailing edge section of the end element.

Typically, the fan, the core engine and an outlet of the turbofan engine are arranged behind each other along a central axis of the engine. In one embodiment variant, the end element can now be attached at the receiving body according to the intended use along an axial direction with respect to this central axis. Consequently, the end element cannot be attached at the receiving body from above or below, but can be attached according to the intended use at the receiving body inside the secondary flow channel along a mounting direction, which substantially extends in parallel to the central axis of the turbofan engine.

According to the invention, the end element further can be plugged into the receiving body. In order to further simplify mounting and dismantling, an end element that is plugged in at the receiving body is secured at the receiving body without the use of tools by means of a self-acting locking mechanism. Consequently, at first the end element is simply plugged in at the receiving body along a mounting direction, and is then held at it automatically by the self-acting locking mechanism, without any tool having to be used and additional fastening elements, such as for example screws, bolts or rivets, having to be attached for that purpose. The end element that is to be attached in a releasable manner at the receiving body comprising the leading edge and/or trailing edge section (and thus possibly a leading edge facing towards a fluid flow or a rear edge that is positioned in the flow direction of the fluid flow) can thus be arrested at the receiving body by simply plugging it in at a predefined end position.

In this end position, additional fastening elements can be attached at the receiving body for the final fixation of the end element. However, the securing of the end element at the receiving body can also be achieved without such fastening elements by means of the self-acting locking mechanism. If, for example, fastening elements are forgotten during the mounting of the splitter fairing, the end element is still retained at the receiving body due to the locking mechanism, and cannot be detached from the same. Further, the end element remains in a predefined position even after any fastening elements that may possibly be additionally provided for fixating the end element at the receiving body have been removed, until the locking mechanism is actuated and a corresponding locking is released.

The locking mechanism can for example comprise at least one locking element at the receiving body, which locks in a self-acting manner with an element and/or a section of the end element if the end element is plugged in at the receiving body according to the intended use. For example, the at least one locking element and the element and/or the section of the end element independently enter into a locked, form-fit contact with each other if the end element is plugged in at the receiving body according to the intended use.

For that purpose, it is provided in one embodiment variant that the locking element of the receiving body and/or the element of the end element are embodied so as to be elastic and/or mounted in a spring-loaded manner. Thus, the locking element of the receiving body and/or the element of the end element can at first be elastically displaced counter to a restoring force as the end element is being plugged in. If the end element takes an end position at the receiving body according to the intended use, the respective element is adjusted into a locking position under the influence of the restoring force.

According to an exemplary embodiment it is provided that the locking element comprises an elastic spring plate which, in a locked state of the locking mechanism, meshes in a form-fit manner with a securing slit with at least one locking section. Here, the at least one locking section of the elastic spring plate can arrest the end element at the receiving body by means of the form-fit meshing with the securing slit. It is for example provided for this purpose that, through the locking section meshing with the securing slit, an engagement occurs behind a section of the end element forming a boundary of the securing slit and/or a part connected to the same. As a result of the spring effect of the elastically designed spring plate, the locking section is pressed or pulled in a self-acting manner into a locking position inside the securing slit, in which the locking section engages behind the section that forms a boundary of the securing slit when the end element takes its end position with respect to the receiving body.

In this context, it can in particular be provided that the securing slit is formed in an L-shaped or hook-shaped manner. In this way, if the end position of the end element is reached, a locking section that is guided at the receiving body inside the L-shaped or hook-shaped securing slit as the end element is being plugged in, can be independently displaced inside the securing slit into an area in which the locking element engages behind a section at the end element and an arresting effect of the end element at the receiving body is provided.

Here, it can also be provided that the spring plate has two locking sections that are arranged at a spatial distance from each other. For example, in a further development that is based thereon, a first locking section of the spring plate meshes with a first securing slit of a retaining part that is provided at a first side surface of the end element. Meanwhile, a second locking section of the spring plate meshes with a second securing slit at a second side surface of the end element that is arranged opposite the first side surface. In this way, via the single spring plate, an arresting effect of the end element at two facing side surfaces is achieved with the help of two locking sections that respectively mesh with a securing slit.

Here, the retaining part with the first securing slit can be provided at an inner side of the first side surface which is not accessible in the connected state of the receiving body and the end element according to the intended use, while the second securing slit is accessible at an outer side of the second side surface. In this way, it is achieved that the spring plate can only be adjusted from the side surface through a displacement of the second locking section at the second securing slit. Due to the fact that the two locking sections are connected to each other in a rigid manner at the spring plate, the one first locking section is automatically adjusted, as well, if the other accessible second locking section is adjusted at the second side surface, for example to release a locking via the locking mechanism.

In another embodiment variant, it is provided that the locking element of the receiving body comprises an adjustably mounted locking hook. In a connected state of the receiving body and the end element according to the intended use, this locking hook is locked in a form-fit manner with a spigot of the end element. Consequently, here the end element with its spigot is plugged in at the receiving body, wherein the locking hook that is preferably prestressed in a spring-loaded manner in a locking position automatically snaps in or at the spigot when the end element is in an end position at the receiving body according to the intended use, so that the end element is held at the receiving body. In one embodiment variant, a spring element, for example in the form of a pressure spring, is mounted at the spigot. Via such a spring element, a sufficiently stable, form-fit connection between the end element and the receiving body is supported, for example. In this manner, as a result of the spring force, the spigot that is plugged into a passage opening can for example be pressed or pulled in the longitudinal direction of the insertion pin against a locking hook of the receiving body which meshes with a circumferential groove of the spigot in order to secure the mesh of the locking hook with the circumferential groove of the spigot. In one variant, in order to be able to apply the spring force necessary for this purpose, a pressure spring is supported, one the one hand, at the edge of the spigot or a support plate of the end element carrying the spigot, and, on the other hand, at a support on which the locking hook is adjustably mounted.

The locking mechanism can be actuated manually to release a locking for securing the end element at the receiving body. Consequently, the end element can be separated from the receiving body only after a manual actuation of the locking mechanism, possibly after the additional fastening elements for the fixation of the end element at the receiving body have been removed. For example, a locking element of the locking mechanism or an actuation element that acts together with the locking element and is embodied correspondingly can be manually adjusted for that purpose. Here, the end element is consequently retained at the receiving body by means of a self-retaining locking mechanism, which can be manually actuated in order to remove the end element from the receiving body.

In this context, it can also be provided that a locking element of the locking mechanism is received inside an interior space that is defined by the end element connected to the receiving body. This interior space is delimited by at least one inner side of a side surface of the locking element, wherein the locking mechanism can be manually actuated from an outer side of this side surface in order to release a locking for securing the end element at the receiving body. Thus, the locking mechanism with the internally located locking element can be actuated and released from the outside without any problems.

Alternatively or additionally, it can be provided that the end element has two side surfaces that are facing away from each other and are connected to each other via the leading edge section or via the trailing edge section of the end element, and the locking mechanism can be actuated only at exactly one of the side surfaces to release a locking. Accordingly, the locking mechanism can consequently be actuated only from one side of the end element. In this way, it is not only easy to specify a defined dismantling order, but it is also achieved that an access to the end element from only one side is sufficient to take the end element off of the receiving body of the splitter fairing.

In one embodiment variant, the splitter fairing has a spacer in order to prevent that the end element collides with possibly sensitive components of the turbofan engine during mounting or dismantling of the splitter fairing. For example, electronical components or (surface) coolers, which can be easily damaged when the end element is removed from the receiving body, can be provided in the area of an inner or outer wall of the secondary flow channel. For that purpose, the spacer of the splitter fairing is provided at the inner or outer wall of the secondary flow channel, so that, in the state according to the intended use in which it is connected to the receiving body, the end element is spaced apart from the respective [wall] by the spacer and abuts the spacer at the top or the bottom side. Here, the spacer extends preferably along a mounting direction along which the end element can be attached at the receiving body according to the intended use. In this way, the end element can be guided along the spacer during mounting as well as dismantling.

Due to its thickness as measured transversely to the mounting direction, the spacer predetermines a distance to be kept between the end element a the [wall] of the secondary flow channel at which the spacer is provided. In this way, the risk that an end element, which is to be mounted or removed, collides with a component of the turbofan engine arranged in extension of the spacer at the respective channel wall is reduced.

The spacer can for example be embodied in a rod-shaped manner and/or can be fixated at the respective channel wall by means of at least one fastening element, such as for example a bolt or a screw. Alternatively or additionally, the spacer is an integral component of the receiving body or is fixated at the same as a separate structural component of the splitter fairing which in this case is comprised of at least three parts.

In one embodiment variant, a projection is provided at the receiving body of the splitter fairing at which the end element is attached, with the projection protruding in the direction of the end element. This projection can have guiding sections for attaching the end element at the receiving body [as a] physical guidance for the end element, in particular it can form the same. For example, the guiding sections respectively form a chamfer for that purpose that extends in a tilted manner with respect to the mounting direction of the end element by means of which the automatic centering of the end element with respect to the projection is achieved during attachment of the end element.

In one embodiment variant, the end element can be attached at the receiving body according to the intended use along a mounting direction, and at least one guiding means is provided at the receiving body by means of which an end position according to the intended use is predefined for the end element with respect to an axis that extends transversely to the mounting direction and/or with respect to an axis that extends radially to a central axis of the turbofan engine when it is attached at the receiving body. Thus, a corresponding guiding means ensures that the end element is present in a certain radial position in its end position before the end element is fixated at the receiving body.

In a further development it is provided in combination with the above-described guiding sections that an end position according to the intended use is predefined for the end element by means of the guiding section of the receiving body, when the end element is attached at the receiving body with respect to a first axis that extends transversely to the mounting direction, and an end position according to the intended use is predefined for the end element with respect to a second axis that extends transversely to the mounting direction as well as transversally to the first axis by means of the at least one guiding means of the receiving body. Thus, via the guiding sections, a centering of two side surfaces of the end element lying opposite each other transversely to the mounting direction is achieved when the end element is attached at the receiving body, while an end position according to the intended use is predefined and thus a radial positioning of the end element is effected through the at least one guiding means obliquely to the same and in the radial direction.

The end element can comprise at least one section that glides along at least one guiding element of the at least one guiding means when the end element is attached at the receiving body. This can be a mounting block, for example, which defines a fastening site for at least one separate fastening element by means of which the end element is fixated at the receiving body.

According to one embodiment variant it is provided that at least one snap-in clip is provided at the receiving body, with a section, in particular a mounting block of the end element connected to the receiving body according to the intended use, is held in a form-fit manner and/or in a force-fit manner at the snap-in clip. For example, a mounting block of the end element is consequently plugged into the corresponding snap-in clip of the receiving body at which the mounting block is held in a form-fit and force-fit manner— for example by means of at least one locking hook of the snap-in clip. Thus, the mounting block of the end element snaps in with the dedicated snap-in clip if the end element is attached at the receiving body according to the intended use.

In one variant, multiple (at least two) mounting blocks that are arranged at a spatial distance from each other are provided at the end element, which respectively snaps in with one of multiple snap-in clips of the receiving body. Here, a snap-in clip can in particular be provided in the area of a projection of the receiving body which protrudes in the direction of the end element.

In one exemplary embodiment, a mounting block defines a fastening site for at least one separate fastening element at the end element, by means of which the end element is (additionally) fixated at the receiving body. For example, a passage opening is provided at the mounting block for that purpose, through which a fastening element, such as a screw or a bolt, is passed through with a thread section, and screwed or plugged into the receiving body in order to fixate the end element at the receiving body, possibly in addition to a locking mechanism.

In order to avoid that the end element is slid onto the receiving body along a mounting direction beyond a predefined length and that the edges of the side surfaces of the end element for example project beyond a shell surface of the receiving body at the assembled splitter fairing, in one variant the end element has at least one stop collar element which determines an end position of the end element at the receiving body. Here, the end element is stopped in the mounting direction at the receiving body by means of the at least one stop collar element and prevents a further displacement of the end element in the mounting direction with respect to the receiving body.

A stop collar element can for example be provided at an above-described mounting block of the end element, for example in the form of a stop nose that is formed thereat and that projects in parallel to the mounting direction.

BRIEF DESCRIPTION OF THE DRAWINGS

The accompanying Figures illustrate possible embodiment variants of the invention by way of example.

FIGS. 1A-1B show an embodiment variant of a turbofan engine according to the invention respectively in perspective view, with the core engine cover and the casing of a secondary flow channel being omitted.

FIG. 3 shows, in sections, a splitter fairing according to a further embodiment variant of a turbofan engine according to the invention with an end element for a rear edge of a splitter fairing which can be plugged in at the receiving body and which is self-retaining at the same, and a longitudinally extending spacer for the end element.

FIG. 4 shows, in a perspective view and individually, the end element of FIG. 3.

FIG. 7 shows, in a view corresponding to FIG. 6B, the splitter fairing, with a self-acting locking mechanism for the securing of the end element at the receiving body being emphasized.

FIG. 7A shows an enlarged rendering of the locking mechanism.

FIG. 7B shows a sectional rendering corresponding to the section line B-B of FIG. 7A.

FIG. 8 shows, in a side view corresponding to FIG. 5C, the splitter fairing, with a fastening opening in a side surface of the end element being emphasized.

FIG. 8C shows, in an enlarged scale, the fastening opening, through which a locking element of the locking mechanism can be adjusted in order to release a locking in a manual manner and to be able to take the end element off of the receiving body.

DETAILED DESCRIPTION

Figure 1B:
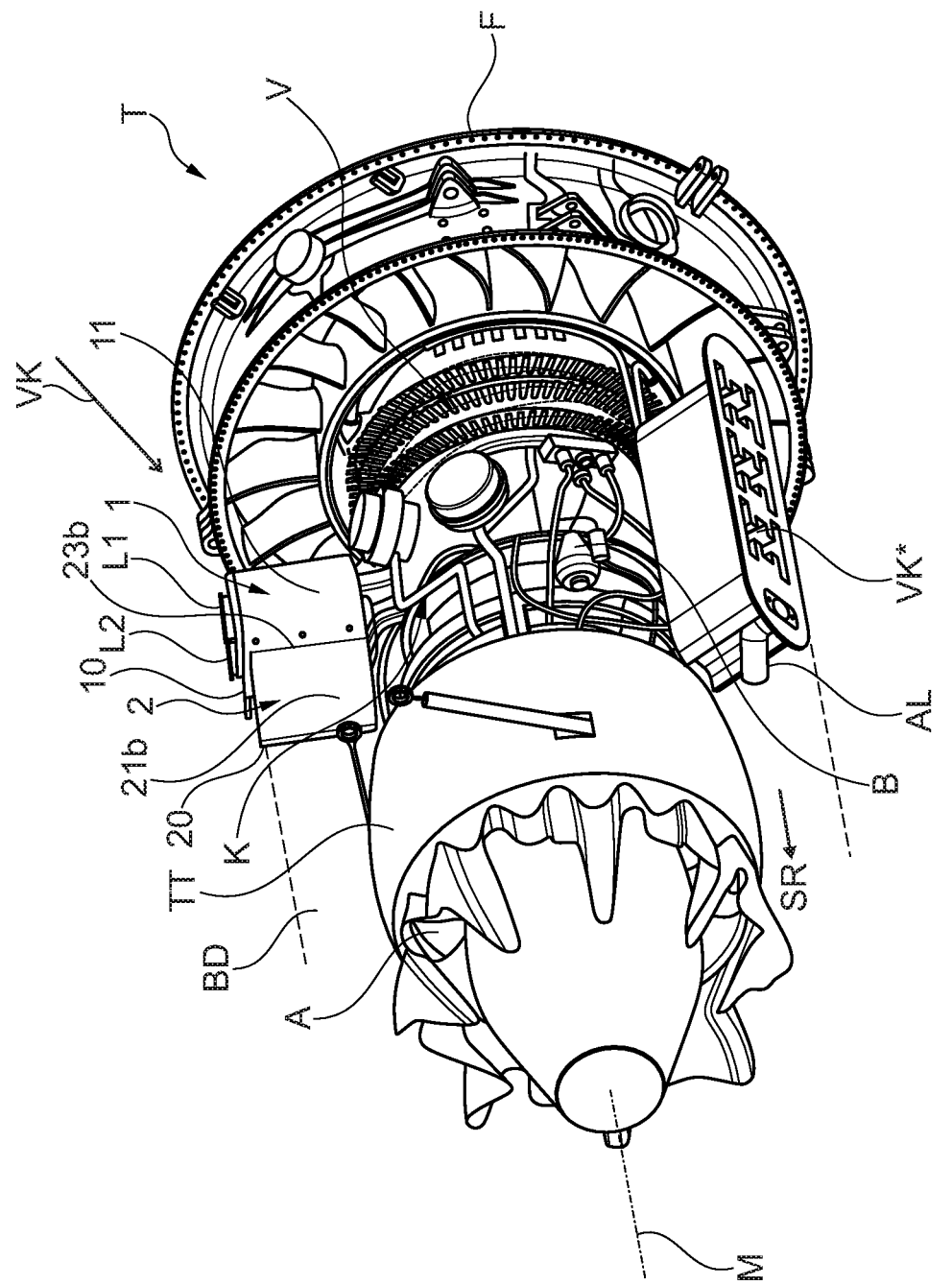

FIGS. 1A and 1B show, in perspective rendering, a turbofan engine T, in which a fan F, a compressor V, a combustion chamber section B, a turbine TT and an outlet A are arranged behind each other along a central axis M of the turbofan engine T in a per se known manner. The compressor V typically comprises a low pressure, medium pressure and high pressure compressor. Likewise, a high pressure, medium pressure and low pressure turbine is part of turbine TT, via which the fan F is driven. The compressor V, the combustion chamber section B and the turbine TT are part of a core engine K of the turbofan engine T, to which a primary flow of inflowing fluid is supplied via the fan F. A corresponding primary flow channel for the inflowing fluid consequently extends through the core engine K along the central axis M.

In addition to that, for the creating a large part of the thrust, a secondary flow channel is provided in the form of a bypass channel BD surrounding the core engine K. Via the fan F, this bypass channel BD is supplied with a large part of the inflowing fluid, which is conveyed along a flow direction SR in the direction of the outlet A. At that, the bypass channel BD is delimited by a radially inner core engine cover or inner bypass channel wall, which is not shown in FIGS. 1A and 1B, and a radially outer external bypass channel wall, which is also not shown in FIGS. 1A and 1B.

In the present case, two splitter fairings VK and VK* which are respectively designed in a housing-like manner are provided inside the bypass channel BD. These (top and bottom) splitter fairings VK and VK* are arranged completely inside the bypass channel BD and extend with respect to the central axis M in the radial direction between the inner bypass channel wall and the bypass channel wall which is located further externally radially. The splitter fairings VK and VK* extend respectively also in that flow direction in which the fluid flows in the direction of the outlet A from the fan F through the bypass channel BD. At that, the splitter fairings VK and VK* are respectively provided for the protective casing of different components that extend in the radial direction with respect to the central axis M and that have to be passed through the bypass channel BD in the radial direction. For example, conduits L1, L2, inside of which fuel, oil or air is conducted, are cased in this way. Alternatively or additionally, coupling elements for the mechanical coupling and driving of systems, which are accommodated radially outside with respect to the core engine K in an outer part of the engine housing for the purpose of a better cooling, such as for example an auxiliary gear box, a fuel pump, an oil pump or a generator, can be cased through the splitter fairings VK and VK*. For example, an outlet conduit AL can be additionally provided at the one splitter fairing VK*, providing a fluid connection between a hollow space inside the engine nacelle and the bypass channel BD.

The splitter fairings VK and VK* are arranged so as to be offset with respect to one another along the circumference of the core engine K, and in the present case accommodate different components. For example, at least two conduits L1 and L2 are received inside the splitter fairing VK inside a hollow space H (cf. FIG. 2B) defined by the splitter fairing VK, inside of which pressurized air is respectively conducted. Here, the hollow space H is defined by a hollow-cylindrical pressure body or receiving body 1 of the splitter fairing VK. This receiving body 1 is made of a fiber-reinforced composite material, for example. Due to its geometry and the chosen material, the receiving body 1 can withstand an increased pressure created in the hollow space H in the event that the conduit L1, L2 burst, and at most lets fluid that flows out from a conduit L1, L2 escape in a controlled manner into the bypass channel BD via the overpressure flap KL of the receiving body 1 that is provided at the lateral shell surface 11 of the receiving body 1 (cf. FIGS. 5A to 5C).

For optimizing the flow that surrounds the splitter fairing VK, the latter has an end element 2 that tapers off in the flow direction SR towards a trailing edge section 20. The end element 2 is consequently attached at a backside 10 of the receiving body 1 along the central axis M in order to achieve an aerodynamically improved surround-flow of the splitter fairing VK inside the bypass channel BD. The end element 2, which in the present case has a V-shaped cross section, is formed as a separate structural component and is connected to the receiving body 1 in a releasable manner. At that, the end element 2 is fixated at lateral shell surfaces 11 of the receiving body 1 with two side surfaces 21a and 21b that end in the trailing edge section 20, so that the lateral shell surfaces 11 of the receiving body 1 transition into the side surfaces 21a and 21b of the end element 2. The fixation of the end element 2 at the receiving body 1 is realized at the fastening sections 23a and 23b of the side surfaces 21a, 21b located near the edge by means of separate fastening elements, such as for example screws, rivets or bolts.

Here, the end element 2 is designed with a focus on an aerodynamically advantageous shape, while the receiving body 1 is primarily designed with a view to pressure loads that may possible occur and possibly also with a view of being fire-proof. In this way, structural components that are adjusted for different functions and that differ from each other with respect to their material and geometry can be provided at the splitter fairing VK. In addition, the end element 2 is connected in a releasable manner to the receiving body 1, so that for example components of the turbofan engine T that are located below the splitter fairing VK, in particular in the area of the core engine cover, as well as possibly components that are received in the receiving body 1 can be accessed more easily by taking off the end element 2 from the receiving body 1. In the present case, a removable rear edge for the splitter fairing VK is for example provided through the end element 2 with a trailing edge section 20, so that components that are arranged in the area of the backside 10 of the receiving body 1 are can be accessed (better) already by removing the end element 2. However, what can of course also be provided alternatively or additionally is an end element that is connected in a releasable manner to the receiving body 2 that is arranged at a front side of the receiving body 1 with a flow-optimized leading edge section that is facing towards the fluid flow.

Figure 2A:
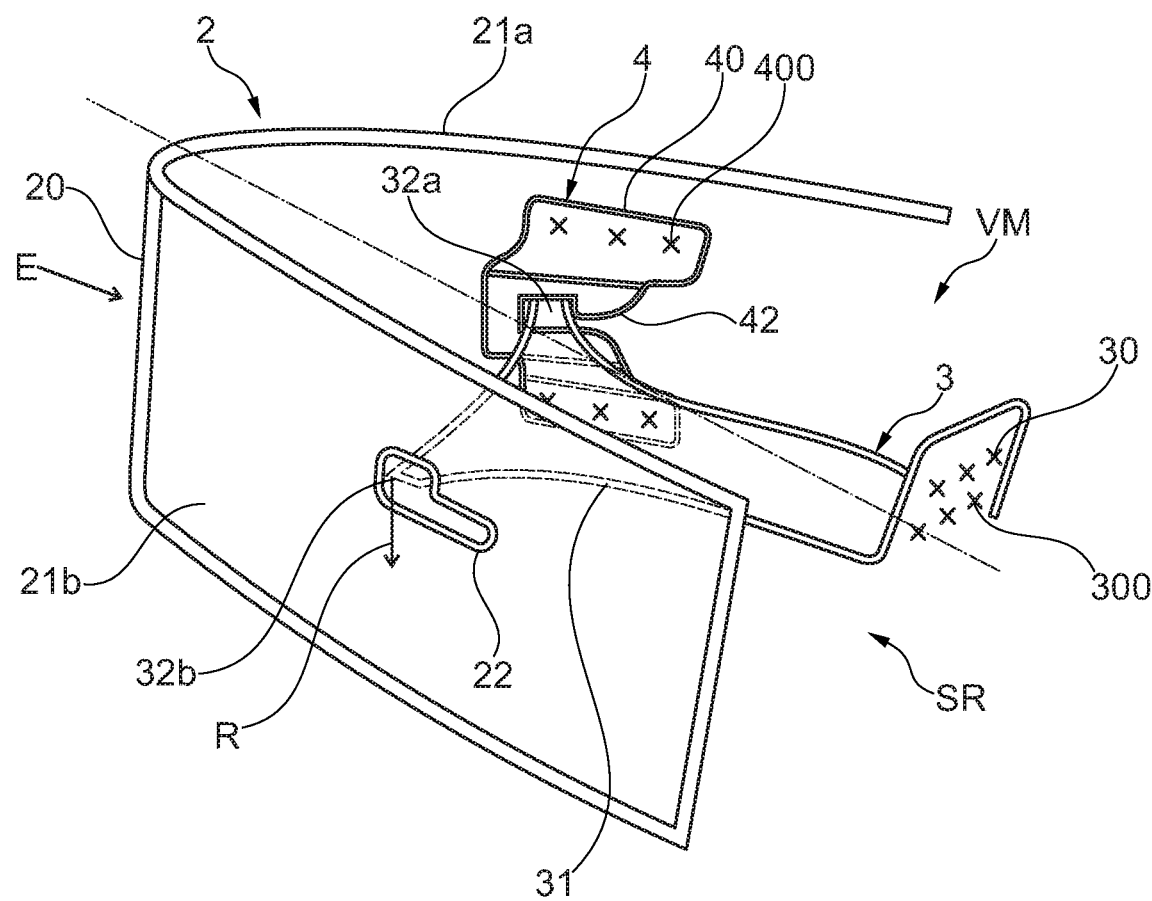
FIG. 2A shows, in sections, an end element for a rear edge of a splitter fairing of the turbofan engine with a locking mechanism, having a spring plate that is fixated at a receiving body of the splitter fairing.
Figure 2B:
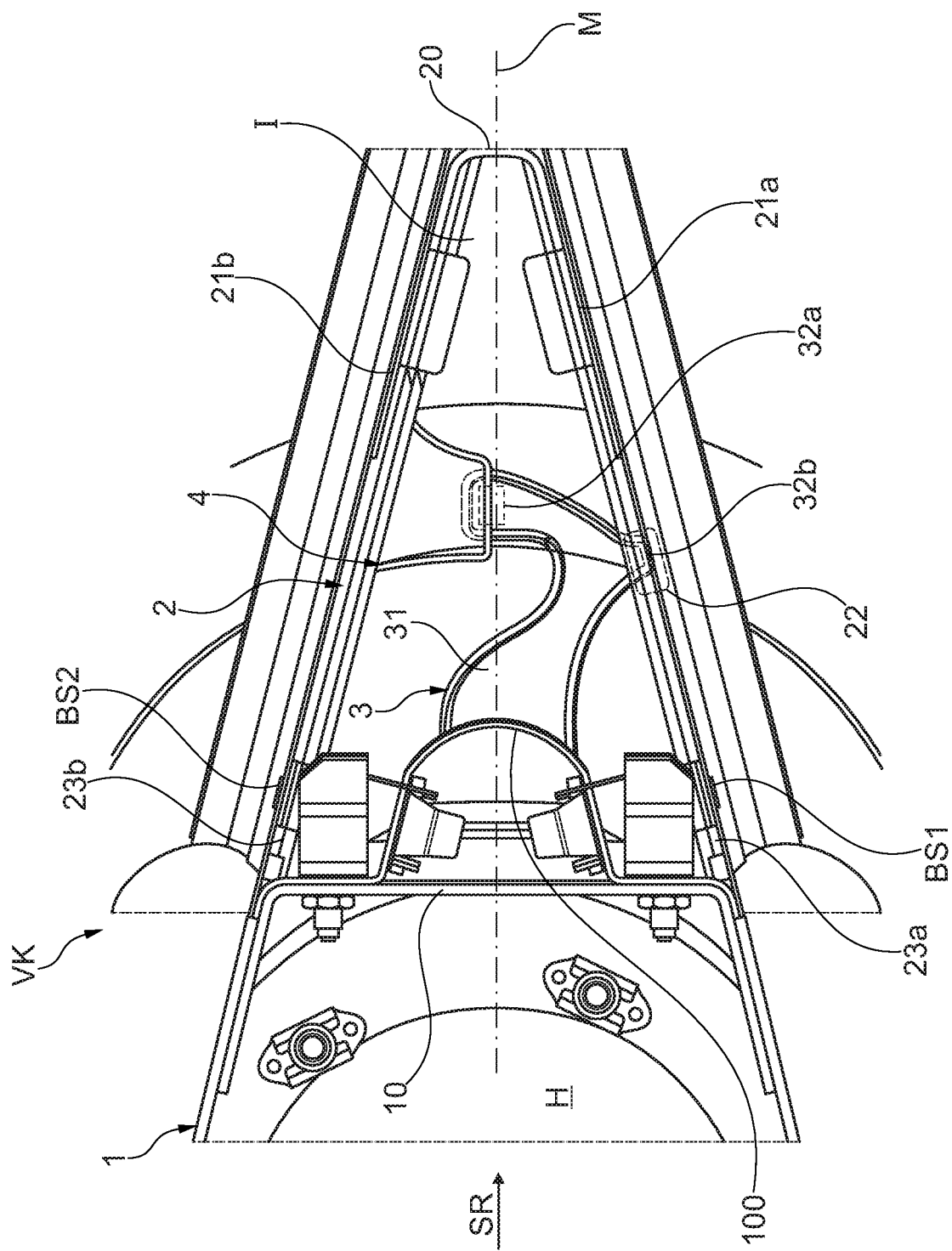
FIG. 2B shows, in sections, the splitter fairing of FIG. 2A in top view, with the end element being secured at the receiving body by means of the locking mechanism.

FIGS. 2A and 2B illustrate a possible further development of the embodiment variant according to FIGS. 1A and 1B. Here, a self-acting locking mechanism VM is provided for securing the removable end element 2 at the receiving body 1. Via this locking mechanism VM, the end element 2 can be simply plugged in at the receiving body 1 at the backside 10 of the receiving body 1 along a mounting direction E that extends in parallel to the central axis M, and is then automatically arrested by means of the locking mechanism VM when a predefined end position is reached.

For that purpose, the locking mechanism VM has a locking element 3 in the form of a spring plate 3 that is fixated at the backside 10 of the receiving body 1. This spring plate 3 protrudes in a tongue-like manner at the backside 10 of the receiving body 1 in the axial direction and is fixated at the receiving body 1 via a fastening section 30 of the spring plate 3. In the present case, the fixation of the spring plate 3 via the fastening section 30 is realized through multiple welded joints 300 at a projection 100 of the receiving body 1 protruding at the backside 10 of the receiving body 1 in the flow direction SR. At its end that is protruding from the fastening section 30, the spring plate 32 forms two locking sections in the form of locking noses 32a and 32b that respectively protrude transversely to the extension direction of the spring plate 3. These locking noses 32a and 32b are formed at a longitudinal extension spring arm 31 of the spring plate 3 protruding from the backside 10. In this manner, the locking noses 32a and 32b can be elastically displaced perpendicular to the extension direction of the spring arm 31 and thus substantially in the radial direction with respect to the central axis M (and the mounting direction E of the end element 2).

Further, securing slits 22 and 42 are provided at the facing side surfaces 21a and 21b at the end element 2. Respectively one of the locking noses 32a and 32b can be brought into mesh with these securing slits 22 and 42 in a form-fit manner in order to retain the end element 2 at the receiving body 1. A first securing slit 42 is formed at a retaining part 4 of the end element 2. This retaining part 4 is fixated at an inner side of the one side surface 21a. For this purpose, a base 40 of the retaining part 4 is fixated at the inner side of the side surface 21*a* by means of multiple welded joints 400. At that, the first securing slit 42, which in the present case has an L-shape, is formed at a section of the retaining part 4 that protrudes from the base 40, wherein a (first) locking nose 32*a* can mesh with the first securing slit 42 along the mounting direction E, as the spring arm 31 of the spring plate 3 is being radially displaced. If the end element 2 is plugged in at the receiving body 1 according to the intended use, a (first) locking nose 32*a* is positioned in a first securing slit 42 of the retaining part 4 at an area of the securing slit 42 that extends in the radial direction. The locking nose 32*a* is then displaced into it under the influence of the restoring force of the spring arm 42, so that then the first locking nose 32*a* reaches into that section of the retaining part 4 that forms the securing slit 42.

A second securing slit 22, which is formed so as to be symmetrical to the first securing slit 42 of the retaining part 4, is provided at the facing side surface 21*b* of the end element 2. However, this second securing slit 42 is formed directly in the side surface 21*b*, so that the other, second locking nose 32*b* of the spring plate 3 is accessible from the outer side of the side surface 21*b* when meshing with this second securing slit 22. While the retaining part 4 and the first locking nose 32*a* of the spring plate 3 connected to the same are thus completely accommodated in a form-fit manner inside an interior space I that is enclosed by the side surfaces 21*a* and 21*b* of the end element 2 and the backside 10 of the receiving body, and are thus triangular in the present case, and therefore are not accessible from the outside if the end element 2 is plugged in, the other, second locking nose 32*b* is present at the side surface 21*b* of the end element 2 in a manner accessible from the outside. In this way, a locking can be manually released from the outside by means of the self-acting locking mechanism V in order to be able to again remove the end element 2 off from the receiving body 1 of the splitter fairing VK.

The self-acting locking mechanism VM, by means of which the end element 2 remains secured at the receiving body 1 even if the fastening sections 23*a* and 23*b* provided at the fastening elements have already been removed, can thus be manually released by engagement at the one side surface 21*b* from the outside at the locking nose 32*b* that is accessible here and it is radially displaced along an actuation direction R inside the corresponding securing slit 22. At that, through a displacement of the locking nose 32*b*, the latter is manually displaced so far that it no longer engages behind a section of the end element 2 forming a boundary of the securing slit 22, and consequently the end element 2 can be pulled out of the receiving body 1 counter to the original mounting direction E. Since the two locking noses 32*a* and 32*b* are rigidly connected to each other via the spring arm 31 of the spring plate 3 for the purpose of being axially secured at the facing side surfaces 21*a* and 21*b*, 32*b*, the facing locking nose 32*a* is also displaced in the event of a displacement of the one locking nose. Thus, in the event of a displacement of the first locking nose 32*b* in the actuation direction R a rear engagement at the internally positioned retaining part 4 is synchronously released. In this manner, a manual unlocking from one side of the end element 2 can be carried out conveniently after the fastening elements provided at the fastening sites BS1 and BS2 for fixation of the end element 2 at the receiving body 1 have been removed. At that, it is achieved via the locking mechanism VM that at first the end element 2 remains at the receiving body 1, even if the corresponding fastening elements have been removed. Thus, the locking mechanism VM does not only facilitate the mounting of the end element 2 at the receiving body 1, but also its dismantling, for example in order to make accessible components of the turbofan engine T located below the end element 2 for the purpose of maintenance or repair.

FIGS. 3, 4, 5A to 5C, 6A to 6B, 7, 7A to 7B, 8 and 8C illustrate an alternative further development of a splitter fairing VK according to the variant of FIGS. 1A and 1B, in which in particular an alternatively embodied, self-acting locking mechanism VM is provided.

Here, too, the end element 2 is formed with a V-shaped cross section and can be plugged in at a backside 10 of the receiving body 1 along the mounting direction E and thus in the axial direction with respect to the central axis M. At that, the end element 2 can be finally fixated at the receiving body 1 only from one of the two side surfaces 21*a*, 21*b*, and can be removed again if required. Thus, bores for fastening sites BS1 and BS2, through which the fastening elements BE (cf. FIG. 6B), such as for example screws or bolts, can be inserted when the end element 2 is present in an end position at the receiving body 1 according to the intended use, are provided only at the one side surface 21*b*, for example. Here, too, in order to retain the end element 2 in this end position by means of a self-acting securing until the additionally provided fastening elements BE are attached or when these fastening elements BE have been removed again, in this variant a locking mechanism VM has, on the one hand, a locking element in the form of a locking hook 61 at the receiving body 1 and, on the other hand, a spigot 261 at the end element 2.

Here, the spigot 261 of the end element 2 is part of a second locking assembly group 26 which is provided at the end element 2. Here, the second locking assembly group 26 is accommodated completely inside an interior space I that is enclosed by two facing side surfaces 21*a* and 21*b* and the backside 10 of the receiving body 1 when the end element 2 is attached at the receiving body 1. Among other components, thee second locking assembly group 26 comprises a support plate 260 by means of which the two side surfaces 21*a* and 21*b* are rigidly connected to each other. The spigot 261 is fixated at this support plate 260 and protrudes from the support plate 260 in the mounting direction E. Further, a spring element in the form of a pressure spring 262 is mounted at the spigot 261.

A first locking assembly group 6 that acts together with the second locking assembly group 26 of the end element 2 is provided at the projection 100 of the receiving body 1 that protrudes in the flow direction SR and thus counter to the mounting direction E. The adjustably mounted locking hook 61 is part of this first locking assembly group 6. This locking hook 61 is mounted at the support 60 of the first locking assembly group 6. Here, the support 60 forms an insertion opening 600 for the spigot 261.

Figure 5A:
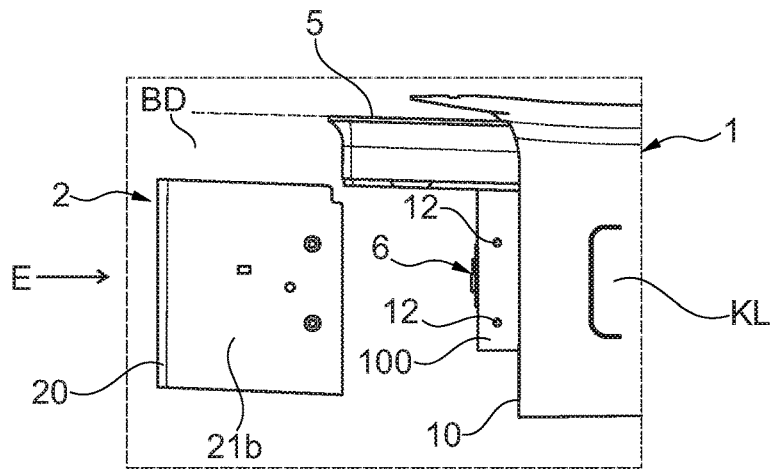
FIGS. 5A-5C show, in corresponding side views and respectively only in sections, the splitter fairing of FIG. 3 in different phases during the attachment of the end element at the receiving body.
Figure 5B:
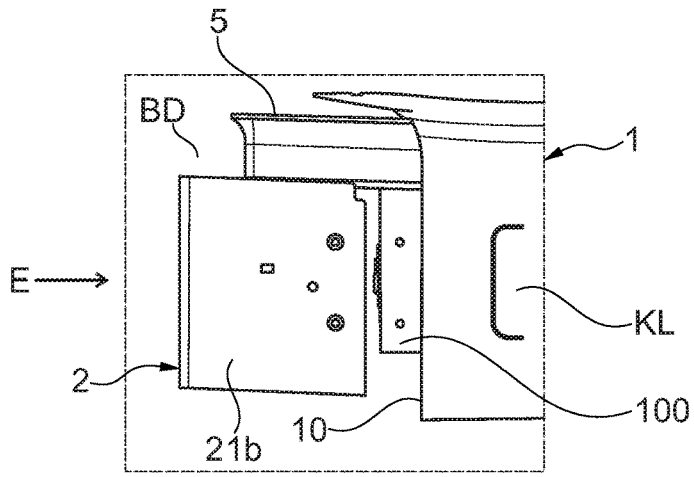
Figure 5C:
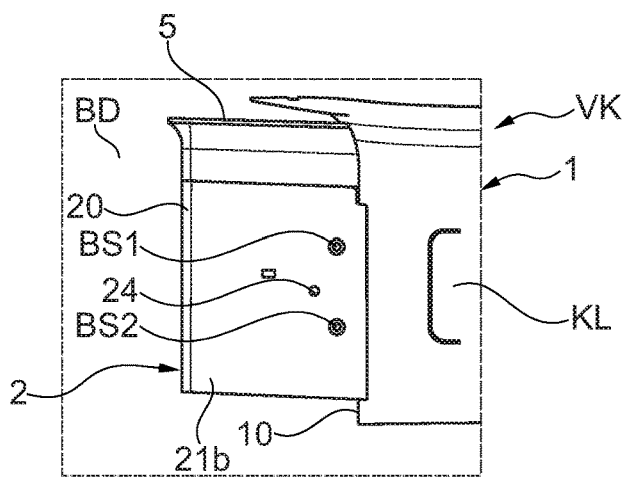

During attachment of the end element 2 at the receiving body 1, which is illustrated based on the FIGS. 5A, 5B and 5C in different phases, the end element 2 approaches along the mounting direction E of the backside 10 of the receiving body 1 and is plugged in at the projection 100. If the end element 2 has reached an end position according to the intended use, the spigot 261 reaches with a conically tapering end through the introduction opening 100 at the support 60 of the first locking assembly group 6. Here, the diameter of the insertion opening 600 is dimensioned in such a manner that the pressure spring 262 can be guided through the insertion opening 600 and is consequently supported at the support 60. The pressure spring 262 is consequently compressed and tensioned in this way, until the spigot 261 is guided through the insertion opening 600 to a maximal degree with its end. At that, the spigot 261 is maximally inserted when a circumferential groove located in front of the conically tapering end of the spigot 261 projects from the insertion opening 600 in the mounting direction E, so that the locking hook 61 can engage at it in a self-acting and form-fit manner. At that, the locking hook 61 is pre-stressed in a spring-loaded manner in a locking position in which the locking hook 61 meshes with the groove of the spigot 261 in a form-fit manner. If the spigot 261 is inserted at the support 60, the locking hook 61 is thus first displaced against a spring force by means of the conical end of the spigot 61 until a mesh with the groove is possible. Here, the locking hook 61 is mounted at the support 60 so as to be rotatable about a pivot axis that extends in parallel to the mounting direction E. Alternatively, the locking hook 61 can for example also be mounted at the support 60 so as to be displaceable transversely to the mounting direction E in order to mesh with the groove of the spigot 261 in the kind of a locking pin.

The form-fit mesh of the locking hook 61 with the spigot 261 is secured by means of the pressure spring 262 that is compressed in the locked state of the locking mechanism VM. In this way, the spigot 261 is loaded counter to the mounting direction E against the support 60 and the locking hook 61 that meshes with the spigot 261 in a form-fit manner. In this manner, the locking hook 261 is connected in a force-fit manner to the support 60 and/or an edge of the spigot 261 that adjoins the groove. In this way, the locking hook 61 cannot get out of mesh with the spigot 261 easily. The functional principle of the locking mechanism VM is also illustrated in more detail in a synopsis of FIGS. 5A to 5C with the FIGS. 6A to 6B, 7 and 7A to 7B.

Figure 6A:
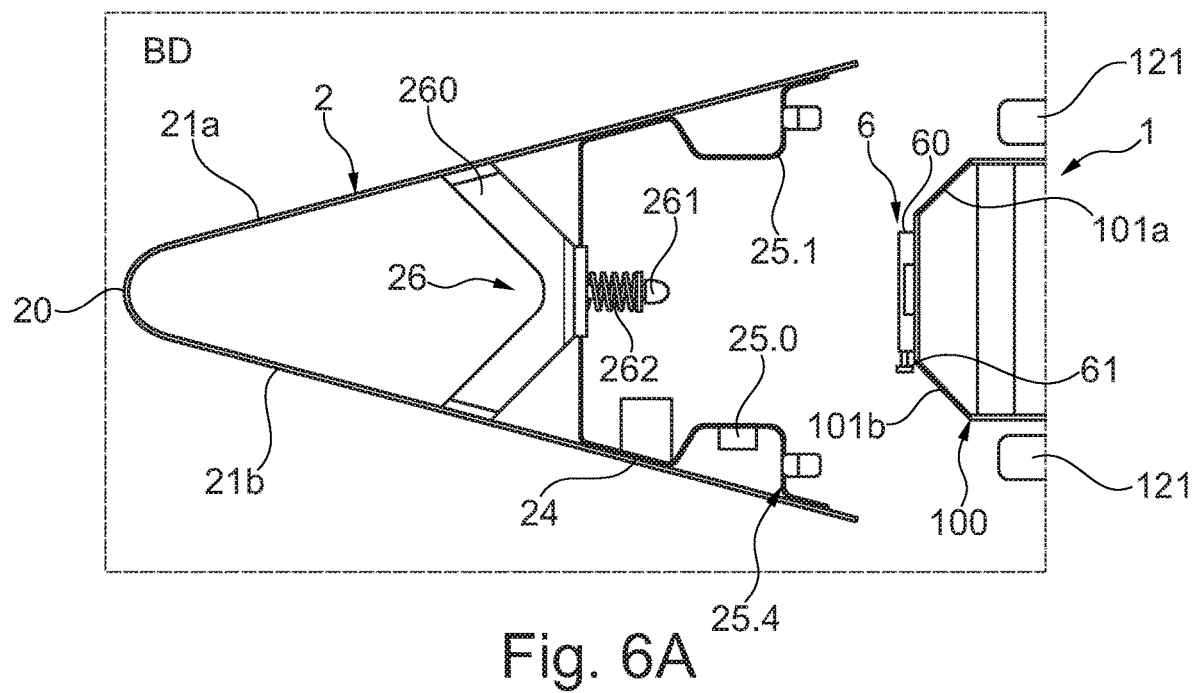
FIG. 6A shows, in top view and in sections, the splitter fairing with an end element that is separated from the receiving body.
Figure 6B:
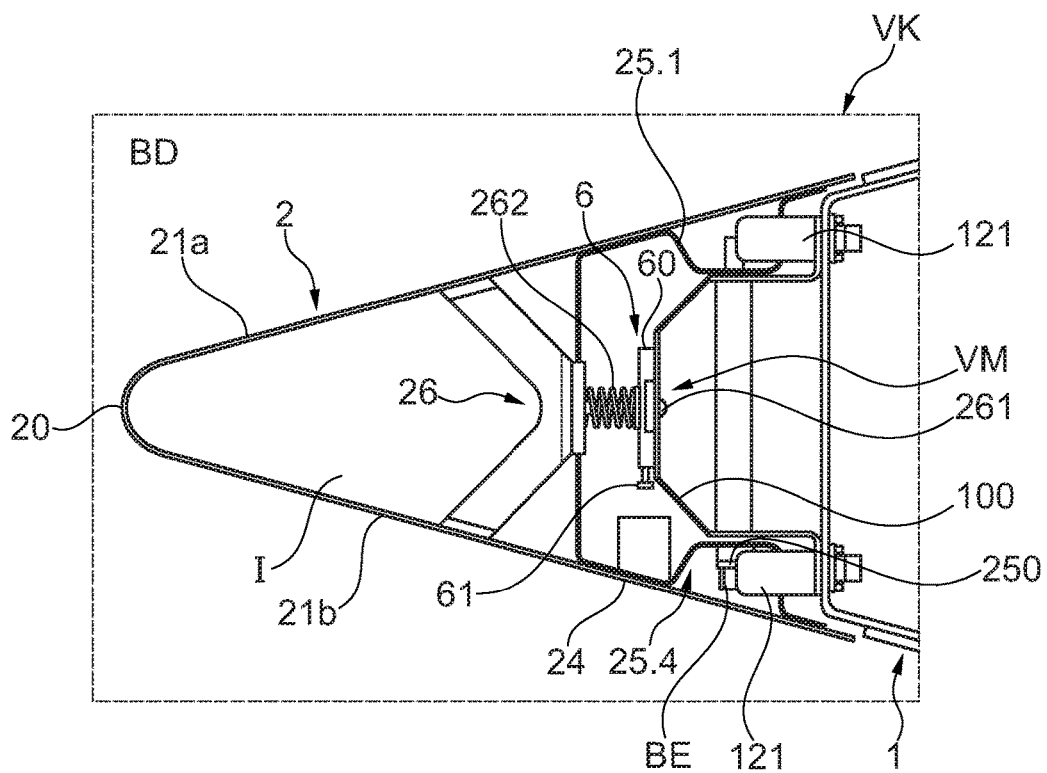
FIG. 6B shows, in top view and in sections, the splitter fairing with the receiving body and the end element in a connected state according to the intended use.

As can in particular be seen in these Figures, additional guiding sections 101a and 101b, having guiding surfaces that are extending obliquely to the mounting direction E, are provided at the projection 100 of the receiving body 1. Via these guiding sections 101a and 101b, the end element 2 is physically guided into the end position according to the intended use as it is plugged in at the backside 10 of the receiving body 1, and is centered in this manner, namely laterally transversally to the mounting direction E along a first axis. In FIGS. 6A and 6B, this first (virtual) axis respectively extends vertically, for example.

Further, multiple guiding means 12 with facing, respectively bent guiding elements 121 and 122 are formed at the receiving body 1 at the backside 10 laterally next to the projection 100. Between these guiding elements 121, 122, mounting blocks in the form of attachments domes 25.1 to 25.4, which are provided at the inner sides of the side surfaces 21a and 21b of the end element 2, are received. Here, respectively two attachments domes 25.1, 25.2; 25.3, 25.4 are provided at an inner side of respectively one side surface 21a or 21b. In the present case, the individual attachment domes 25.1 to 25.4 are respectively formed by a welded on screwed plate. When the end element 2 is attached according to the intended use, each attachment dome 25.1 to 25.4 is received at a guiding element 12 of the receiving body 1 and can be held between the respective pair of guiding elements 121 and 122 in a form-fit manner and possibly also in a force-fit manner. For example, it can be provided that a pair of guiding elements 121, 122 of a guiding means 12 is formed as a pair of locking hooks that are pre-loaded towards one another, so that an attachment dome 25.1 to 25.4 can be clipped thereat. Thus, an additional arresting of the removable end element 2 at the receiving body 1 can be provided by means of the clipped-in attachments domes 25.1 to 25.4.

In principle, the guiding elements 121, 122 of the guiding means 12 serve for predefining end position for the end element 2 with respect to a (second) axis that extends radially with respect to the central axis M according to the intended use by means of the attachments domes 25.1 to 25.4 that are guided along the guiding elements 121, 122 of the guiding means 12 during mounting of the end element 2. In the FIGS. 5A to 5C, this second (virtual) axis extends respectively vertically, for example. Consequently, a radial position with respect to the receiving body 1 and a spacer 5 that will be defined in more detail below is pre-defined for the end element 2 according to the intended use. In particular, it is ensured by means of the guiding means 12 that the side surfaces 21a, 21b of the end element 2 do not protrude radially outwards beyond the groove 50 of the spacer 5. In this way, any bending of the side surfaces 21a, 21b during attachment at the receiving body 1 is also avoided by the guiding means 12.

An attachment dome pair 25.3, 25.4 of the one side surface 21b is provided with passage openings 250 for respectively one fastening element in the form of a threaded bolt BE. Here, the respective passage opening 250 is located inside the interior space I of a through-hole that defines a fastening site BS1 or BS2 at the exterior side opposite to the side surface 21b. In this way, when the end element 2 is plugged in, the respective threaded bolt BE can be attached for the (additional) fixation of the end element 2 at the receiving body 1 from the outside and can be screwed into the projection 100 of the receiving body 1. Even though in the shown variant two attachments domes 25.1, 25.2 or 25.3, 25.4 are provided per side, this is of course not necessarily the case. For example, one attachment dome per side may be sufficient.

To prevent that the end element 2 is pushed onto the receiving body 1 along the mounting direction E beyond a predefined length and e.g. the edges of the side surfaces 21a, 21b protrude beyond the shell surface 11 of the receiving body 1 at the assembled splitter fairing VK, respectively two facing attachment domes 25.1, 25.4 and 25.2, 25.3 form stop collar elements in the form of stop noses 251 that are protruding in the mounting direction E. These stop collar elements 251, that are arranged laterally next to the projection 100, block any further displacement of the end element 2 relative to the receiving body 1 in the mounting direction E when the end element 2 is attached to the receiving body 1 as the receiving body 1 is stopped thereat in the area of a guiding means 12. In this manner, an end position of the end element 2 with respect to the receiving body 1 is predefined by means of the stop collar elements 251 of the end element 2, in which end position the side surfaces 21a and 21b being flush or almost flush with the shell surface 10 of the receiving body 1, and subsequently the fixation of the end element 2 at the receiving body 1 is performed. Also, any excessive displacement of the side surfaces 21a, 21b along the mounting direction E and any undesired plastic deformation of the side surfaces 21a, 21b as they may occur as a result is avoided by means of the stop noses 251.

In the shown variant, fastening sites BS1 and BS2 for additional fixation of the end element 2 at the receiving body 1 can be provided only at one of the side surfaces 21a, 21b in order to exactly determine mounting and dismantling of the end element 2 via exactly one side. In that case, a fastening opening 24 is also provided at the side surface 21b of the end element 2 at which the fastening sites BS1 and BS2 are predefined, which is illustrated in more detail in FIGS. 8 and 8C. Via this fastening opening 24, an actuation arm or lever of the locking hook 61 is accessible in the interior space I. Consequently, a mechanic can reach the actuation arm or lever through the fastening opening 24, possibly by means of a tool, and thus the locking hook 61 so as to adjust the it and release a locking in this way. At that, the end element 2 remains retained at the receiving body 1 through the locking mechanism VM after all threaded bolts BE have been removed, until the locking hook 61 is adjusted due to an actuation through the fastening opening 24, and thus the end element 2 that is unlocked as a result can be pulled off from the receiving body 1.

In order to in particular minimize the risk that, as the element 2 is being mounted to or dismounted from the receiving body 1, the removable end element 2, which in the present case forms a rear edge of the splitter fairing VK, collides with a component that is arranged at a radially outer bypass channel wall, the splitter fairing VK is additionally equipped with a spacer 5 corresponding to the embodiment variant of FIGS. 3 to 8C.

The spacer 5 extends in a web-like manner at the backside 10 of the receiving body 1 along the mounting direction E and thus substantially in parallel to the central axis M of the turbofan engine T. Here, the spacer 5 protrudes beyond the projection 100 of the receiving body 1 at the backside 10 at the receiving body 1, and can define a physical guidance for the end element 2 during attachment at the receiving body 1 as well as during removal from the receiving body 1 independently of a contact of the end element 2 with the projection 100. In the connected state of receiving body 1 and end element 2 according to the intended use, the end element 2 adjoins the spacer 5 with a top side. Here, the trailing edge section 20 of the end element 2 can also be flush with the spacer 5. Likewise, the side surfaces 21a and 21b end element 2 can be flush or almost flush with an outer shell surface of the spacer 5. For this purpose, an upper edge of the respective side surface 21a, 21b adjoins at circumferential groove 50 of the spacer 5 in a connected state according to the intended use.

By means of the spacer 5, a minimum distance of the end element 2 with respect to the outer bypass channel wall (shown in a dashed manner in FIG. 5A) is predefined in the area of the receiving body 1, in particular as the end element 2 is being plugged in at the receiving body 1 and also as it is pulled off of the same. Through the spacer 5, the risk of the end element 2 colliding with a component that is arranged in extension of the spacer 5 at the outer bypass channel wall, for example an area fan that is provided here, is minimized. In contrast to the shown embodiment variant, a corresponding spacer for an inner bypass channel wall can be (possibly also additionally) provided. Moreover, the spacer 5 extends the aerodynamic curvature of the trailing edge section 20 between the spacer element 2 and the outer bypass channel wall.

In the present case, the spacer 5 is embodied as a separate structural component that is fixated at the receiving body 1 and/or at the outer bypass channel wall, for example by means of at least one bolt. Here, the spacer 5 can also be formed from a different material than the receiving body 1 and/or the spacer element 2 of the splitter fairing VK. For example, the spacer 5 is made of a composite material. In an alternative embodiment variant, the spacer 5 is formed by the receiving body 1, that is, it is formed integrally at the same.

In a further development that is illustrated in an exemplary manner based on FIG. 8, at least one draining hole 27 can be additionally provided at one side surface 21a, 21b of the end element 2. This is for example advantageous if (further) conduits are guided inside the interior space I, which in the connected state is enclosed by the side surfaces 21a and 2b of the spacer element 2 and the backside 10 of the receiving body 1. Here, fluid that may possibly leak from such a conduit can be guided outwards via a draining hole 27.

Figure 9:
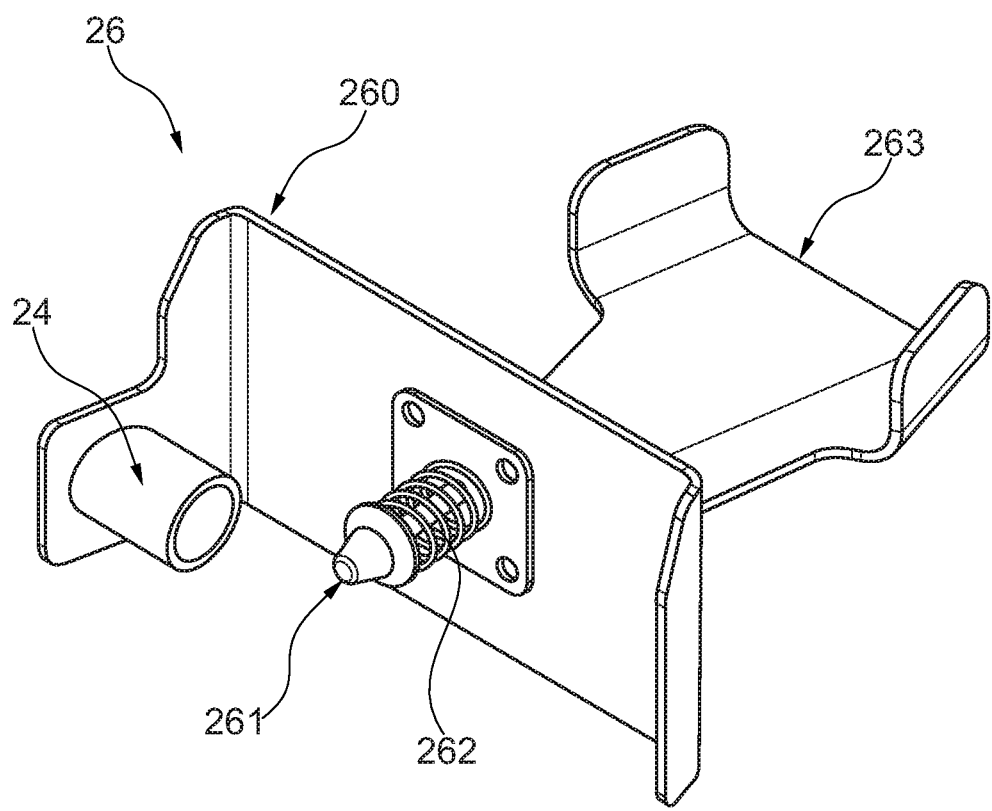
FIG. 9 shows, in single view, a second locking assembly group of the end element of the embodiment variant of FIGS. 3 to 8C.

FIG. 9 shows the second locking assembly group 26 in a perspective single view and thus in an enlarged scale. A sleeve-shaped element for the attachment opening 24 is located at a laterally protruding extension on a front side of the support plate 260 with the spigot 261 and the pressure spring 262. A V-shaped support structure 263 is centrally fixated, for example welded on, at a backside of the support plate 260. This support structure 263 serves for supporting the support plate 260 at the side surfaces 21a and 21b of the end element 2. For that purpose, at its two ends that are projecting from the support plate 260, the support structure 263 is fixated at the inner side of a respective side surface 21a or 21b via bent sections, for example also by means of welding.

Figure 10:
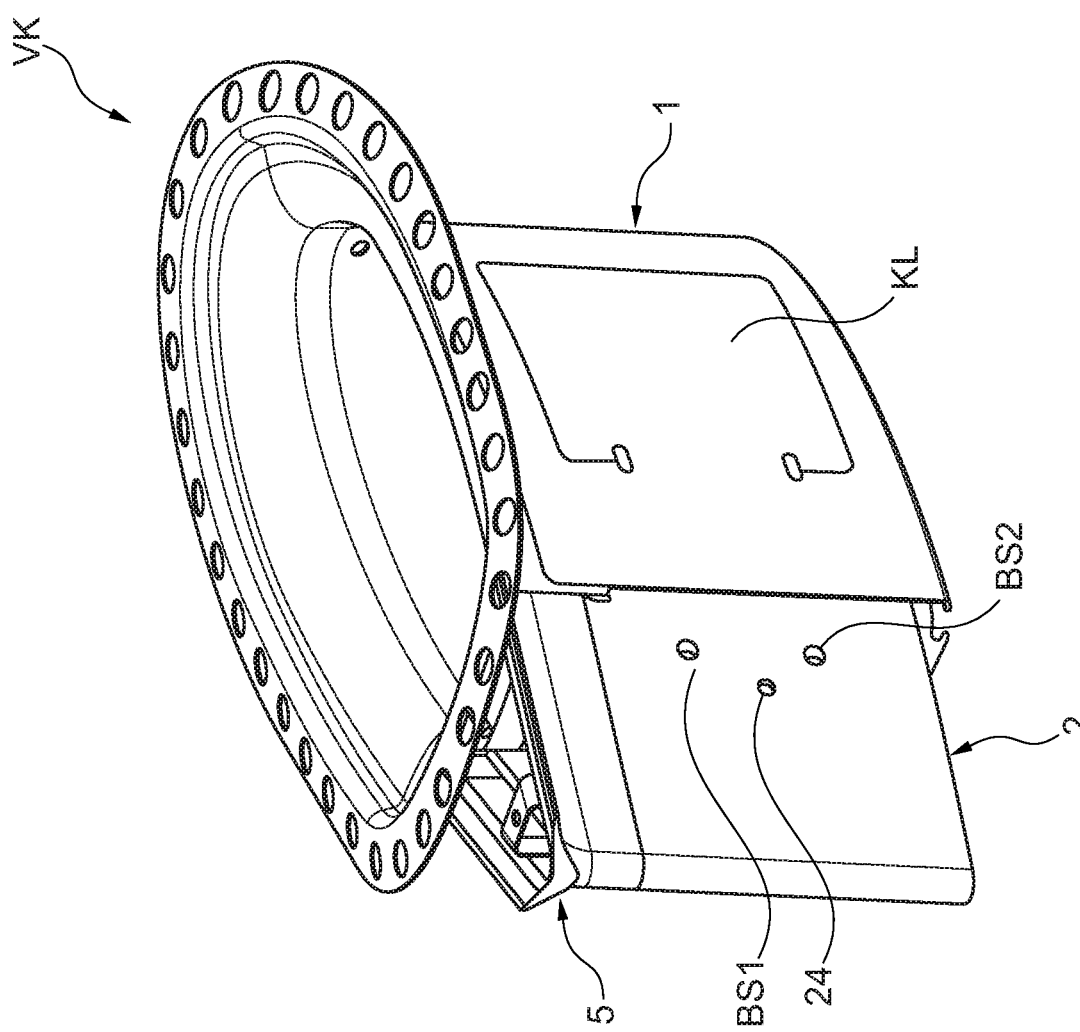
FIG. 10 shows, in a perspective manner, the splitter fairing according to the embodiment variant of FIGS. 3 to 9.

FIG. 10 shows a splitter fairing VK of the embodiment variant that is explained based on FIGS. 3 to 9 with a receiving body 1, an end element 2 and a spacer 5 in the assembled state in a perspective view, and with a view onto that side of the splitter fairing VK at which the fastening sites BS1 and BS2 as well as the fastening opening 24 are provided.

PARTS LIST 1 receiving body
10 backside
100 projection
101a, 101b guiding section
11 shell surface
12 guiding means
121, 122 guiding element
2 end element
20 trailing edge section
21a, 21b side surface
22 securing slit
23a, 23b fastening section
24 fastening opening
25.1-25.4 attachments dome
250 passage opening
251 stop nose (stop collar element)
26 2nd locking assembly group
260 support plate
261 spigot
262 pressure spring (spring element)
263 support structure
3 locking plate (locking element)
30 fastening section
300 welded joint
31 spring arm
32a, 32b locking nose (locking section)
4 retaining part
40 base
400 welded joint
42 securing slit
5 spacer
50 groove
6 1st locking assembly group
60 support
600 insertion opening 61 locking hook (locking element)
A outlet
AL outlet conduit
B combustion chamber section
BD bypass channel
BE threaded bolt (fastening element)
BS1, BS2 fastening site
E mounting direction
F fan
H hollow space
I interior space
K core engine
KL overpressure flap
L1, L2 conduit
M central axis/rotational axis
R actuation direction
SR flow direction
T turbofan engine
TT turbine
V compressor
VK, VK* splitter fairing
VM locking mechanism

The invention claimed is:

1. A turbofan engine, comprising
   a core engine and a fan by which fluid is guided to a primary flow channel for the core engine as well as to a secondary flow channel of the turbofan engine, wherein the secondary flow channel is provided for an outer fluid flow that is guided past the core engine, and
   a splitter fairing that is arranged inside the secondary flow channel and around which the outer fluid flow flows during operation of the turbofan engine, the splitter fairing enclosing a component of the turbofan engine that is guided radially through the secondary flow channel at least partially and that has an end element with at least one chosen from a leading edge section that faces towards the outer fluid flow and a trailing edge section that is positioned in a flow direction of the outer fluid flow, wherein
      the end element is a separate structural component that is connected in a releasable manner to a receiving body of the splitter fairing which is arranged inside the secondary flow channel and which accommodates the component, and
      the end element is plugged in at the receiving body and secured at the receiving body by a self-acting locking mechanism requiring no tools for actuation, the self-acting locking mechanism including a projecting member engaging an aperture;
   wherein, at the receiving body, the self-acting locking mechanism further includes a locking element that includes a locking surface that engages and locks in a self-acting manner with at least one chosen from an element and a section of the end element when the end element is plugged in at the receiving body.

2. The turbofan engine according to claim 1, wherein the fan, the core engine and an outlet of the turbofan engine are arranged behind each other along a central axis, and the end element is attached at the receiving body along an axial direction with respect to the central axis.

3. The turbofan engine according to claim 1, wherein at least one chosen from the locking element of the receiving body and the element of the end element is at least one chosen from formed elastically and mounted in a spring-loaded manner.

4. The turbofan engine according to claim 1, wherein the locking element comprises an elastic spring plate that includes at least one locking section for meshing with a securing slit in a form-fit manner.

5. The turbofan engine according to claim 4, wherein the at least one locking section includes a first locking section for meshing with a first securing slit of a retaining part provided at a first side surface of the end element, and a second locking section for meshing with a second securing slit at a second side surface of the end element that is located opposite the first side surface.

6. The turbofan engine according to claim 5, wherein the retaining part with the first securing slit is provided at an inner side of the first side surface that is inaccessible in a connected state of the receiving body and end element, and the second securing slit is accessible at an outer side of the second side surface.

7. The turbofan engine according to claim 1, wherein the locking element comprises an adjustably mounted locking hook that includes the locking surface which is locked with a spigot of the end element in a form-fit manner in a connected state of the receiving body and the end element.

8. The turbofan engine according to claim 1, wherein the self-acting locking mechanism is manually actuatable to release a locking for securing the end element at the receiving body.

9. The turbofan engine according to claim 8, wherein the end element has two side surfaces that face away from each other and that are connected to each other by the leading edge section or the trailing edge section, and the self-acting locking mechanism is actuatable at exactly one of the two side surfaces to release the locking for securing the end element at the receiving body.

10. The turbofan engine according to claim 1, wherein the self-acting locking mechanism is manually actuatable to release a locking for securing the end element at the receiving body and wherein the locking element is received in an interior space defined by the end element that is connected to the receiving body and delimited by an inner side of a side surface of the locking element, and the self-acting locking mechanism is manually actuatable from an outer side of the side surface to release the locking for securing the end element at the receiving body.

11. The turbofan engine according to claim 1, wherein the end element is attached at the receiving body along a mounting direction, and further comprising a spacer that extends longitudinally along the mounting direction, with the end element adjoining the spacer with a top or bottom side that is positioned transversely to the mounting direction in a connected state of the receiving body and the end element.

12. The turbofan engine according to claim 11, wherein the spacer is fixated at a channel wall of the secondary flow channel.

13. The turbofan engine according to claim 1, wherein the end element is attached at the receiving body along a mounting direction, and further comprising a guide member including a projecting guide surface provided at the receiving body by which an end position is predefined for the end element with respect to at least one chosen from an axis extending transversely to the mounting direction and an axis extending radially to a central axis of the turbofan engine when the end element is attached at the receiving body.

14. The turbofan engine according to claim 13, wherein the end element comprises a section that glides along the projecting guide surface during attachment of the end element at the receiving body.

15. The turbofan engine according to claim 14, wherein the end element section comprises a mounting block that defines a fastening site for a separate threaded fastener by which the end element is fixated at the receiving body.

16. The turbofan engine according to claim 1, wherein the end element is attached at the receiving body along a mounting direction, and further comprising a guide member including a projecting guide surface provided at the receiving body by which an end position is predefined for the end element with respect to at least one chosen from an axis extending transversely to the mounting direction and an axis extending radially to a central axis of the turbofan engine when the end element is attached at the receiving body, and wherein, when the end element is attached at the receiving body, an end position is predefined for the end element with respect to a first axis extending transversely to the mounting direction by the projecting guide surface of the receiving body, and an end position with respect to a second axis extending transversely to the mounting direction as well as transversely to the first axis is defined by the guide member.

17. The turbofan engine according to claim 1, and further comprising a guide member including a projecting surface provided at the receiving body, with a section of the end element connected to the receiving body being retained at the guide member in at least one chosen from a form-fit manner and a force-fit manner.

18. A turbofan engine, comprising
a core engine and a fan by which fluid is guided to a primary flow channel for the core engine as well as to a secondary flow channel of the turbofan engine, wherein the secondary flow channel is provided for an outer fluid flow that is guided past the core engine, and
a splitter fairing that is arranged inside the secondary flow channel and around which the outer fluid flow flows during operation of the turbofan engine, the splitter fairing enclosing a component of the turbofan engine that is guided radially through the secondary flow channel at least partially and that has an end element with at least one chosen from a leading edge section that faces towards the outer fluid flow and a trailing edge section that is positioned in a flow direction of the outer fluid flow, wherein
the end element is a separate structural component that is connected in a releasable manner to a receiving body of the splitter fairing which is arranged inside the secondary flow channel and which accommodates the component, and
the end element is plugged in at the receiving body and secured at the receiving body by a self-acting locking mechanism requiring no tools for actuation, the self-acting locking mechanism including a projecting member engaging an aperture;
a projection protruding in a direction of the end element provided at the receiving body, the projection including guiding sections for physically guiding the end element at the receiving body during connection of the end element.

19. A turbofan engine, comprising
a core engine and a fan by which fluid is guided to a primary flow channel for the core engine as well as to a secondary flow channel of the turbofan engine, wherein the secondary flow channel is provided for an outer fluid flow that is guided past the core engine, and
a splitter fairing that is arranged inside the secondary flow channel and around which the outer fluid flow flows during operation of the turbofan engine, the splitter fairing enclosing a component of the turbofan engine that is guided radially through the secondary flow channel at least partially and that has an end element with at least one chosen from a leading edge section that faces towards the outer fluid flow and a trailing edge section that is positioned in a flow direction of the outer fluid flow, wherein
the end element is a separate structural component that is connected in a releasable manner to a receiving body of the splitter fairing which is arranged inside the secondary flow channel and which accommodates the component, and
the end element is plugged in at the receiving body and secured at the receiving body by a self-acting locking mechanism requiring no tools for actuation, the self-acting locking mechanism including a projecting member engaging an aperture;
wherein the end element includes a stop collar that determines an end position of the end element at the receiving body with respect to a mounting direction along which the end element is attached to the receiving body, the end element being stopped by the stop collar element at a section of the receiving body in the mounting direction, the stop collar preventing any further displacement of the end element with respect to the receiving body in the mounting direction.

* * * * *